3,395,125
Patented July 30, 1968

1

3,395,125
LINEAR POLYGLUTARALDEHYDE
Wendell W. Moyer, Jr., Parkersburg, W. Va., assignor to Borg-Warner Corporation, Chicago, Ill., a corporation of Illinois
No Drawing. Continuation of application Ser. No. 252,062, Jan. 17, 1963. This application Oct. 13, 1966, Ser. No. 586,571
3 Claims. (Cl. 260—67)

ABSTRACT OF THE DISCLOSURE

Polyglutaraldehyde provided by intra-intermolecular polymerization of glutaraldehyde and a method of making same.

This case is a continuation of S.N. 252,062, filed Jan. 17, 1963, now abandoned.

Linear polymers of monoaldehydes such as formaldehyde, acetaldehyde, propionaldehyde, butyraldehyde, and the like have been prepared, and a few of these polymers have provided new and interesting plastic materials. Some of the more versatile polymers have found use as films, fibers, molded parts, etc. While it has been possible to prepare polymers from the monoaldehydes, as indicated, little work has been done on the polymerization of dialdehydes.

The present invention is directed to the polymerization of a dialdehyde, namely, glutaraldehyde, a non-conjugated dialdehyde. The polymerization of glutaraldehyde has resulted in high molecular weight, soluble (linear) polyacetal resins. The polyglutaraldehyde polymers of this invention are obtained by polymerizing glutaraldehyde in a stereoregular manner, largely by an intra-intermolecular propogation mechanism to give products of the general structure indicated in Equation 1 below.

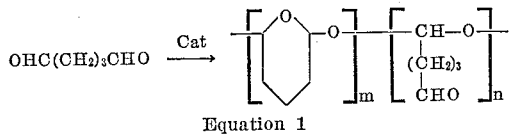

Equation 1 wherein $m$ is greater than $n$.

The polymerization of the glutaraldehyde is promoted by catalyst to effect high molecular weight polymers. Catalysts that have been found to be effective for the polymerization of the higher aldehydes, i.e., other than formaldehyde, have been found effective for glutaraldehyde. Examples of these catalysts are the organo-metallic compounds, metal halides, mixed organo-metallic-metal halides, metal alkoxides, metal hydrides, and tertiary phosphines.

The polymerization will proceed over a wide temperature range, but is preferably conducted within a range from −75° to 0° C.

The polyglutaraldehyde polymers must be stabilized after polymerization to prevent degradation for they are unstable when formed, as are the monoaldehyde polymers. Stabilization is accomplished by treating the polymer in the form of a solution in an inert solvent such as dichloromethane, benzene, or the like with a hemiacetal "capping" reagent added to stabilize the polymer. The hemiacetal reagent may be an ester end-group precursor, i.e., an esterifying reagent such as acetate anhydride, propionic anhydride, benzoic anhydride, etc. The ester end-group precursor is always used in conjunction with a catalyst acid acceptor such as pyridine. Other ester end-group precursors such as acetyl chloride, benzoyl chloride, and butyryl chloride are also suitable when used in conjunction with an acid acceptor. The labile end-groups may also be stabilized by etherifying, that is by adding an ether

2 end-group precursor such as trimethyl or triethylorthoformate or orthoacetates with boron trifluoride as a catalyst. The stabilization serves to modify the labile end-groups of the polymer and provide end-groups which are sufficiently stable to prevent depolymerization.

The polymers are completely and reversibly soluble in common solvents such as methylene chloride, tetrahydrofuran, pyridine, and benzene.

The process of making the polymers of this invention will now be further illustrated by the following examples. It should be understood that the examples are given merely by way of explanation, not of limitation, and that numerous changes and modifications may be made in the details without departing from the spirit and the scope of the invention as hereinafter claimed.

Example I

Aluminum isopropoxide, 0.25 g., dissolved in 46 g. of toluene was introduced into a 3-neck, 500 ml., round bottom flask fitted with a mechanical stirrer, addition funnel, and thermometer. An atmosphere of dry nitrogen was maintained in the reaction flask which was partially emerged into a Dry Ice-acetone cooled bath maintained at a temperature between −52° and −62° C. A solution of 25 g. of freshly distilled, anhydrous glutaraldehyde in 54 g. of toluene was added during 100 minutes to the stirred catalyst solution. After the addition was complete, the reaction mixture was stirred, at the prescribed temperature, an additional 18 hours. The cold viscous toluene solution of the polyglutaraldehyde was coagulated into hexane. The polymer, separated by filtration, was redissolved in 50 ml. of anhydrous pyridine to which a mixture of 10 ml. of acetic anhydride and 2 ml. of acetyl chloride were slowly added, followed by 0.5 g. of anhydrous sodium carbonate.

The acetylation was allowed to proceed with constant stirring for 1.5 hours at room temperature. The acetyl stabilized polyglutaraldehyde was coagulated into methanol, then redissolved in methylene chloride and again coagulated into hexane. A yield of 3 g. (12 percent) white, powder-like product was obtained; M.P. 123° to 133° C. The stabilized polymer was readily soluble in methylene chloride, pyridine, and tetrahydrofuran. It was stable at the melting point. Transparent films were cast from the molten polymer by solution casting techniques. The infrared spectrum was in agreement with the proposed structure. An X-ray diffraction pattern of the polymer showed that it was crystalline. The inherent viscosity was 0.94, (0.3 g./100 ml. methylene chloride at 25° C.).

Example II

The equipment used was the same as in Example I. A solution of 42 g. of anhydrous glutaraldehyde in 83 g. of anhydrous tetrahydrofuran was added over 100 minutes to a solution consisting of 0.57 g. of boron trifluoride etherate and 68 g. of anhydrous tetrahydrofuran. The reaction solution was stirred for 7 hours at −73° C. under an atmosphere of dry nitrogen. The cooling bath was removed, and a solution of 10 ml. of acetic anhydride and 2 ml. of acetyl chloride in 50 ml. of anhydrous pyridine was added to the cold reaction solution. The reaction mixture was allowed to warm to room temperature, and stirring continued an additional 3 hours. The resulting solution was coagulated into slightly alkaline methanol. The crude, stabilized polyglutaraldehyde was purified by dissolving in methylene chloride and recoagulating into hexane. The product was dried under reduced pressure at room temperature. A yield of 27.2 g. (64.7 percent) of white, powder-like product was obtained. The polymer had an inherent viscosity of 0.175 (0.4 g./100 ml. methylene chloride at 25° C.) and was stable in the molten form. Transparent films were cast from the molten polymer by solution casting techniques. The infrared spectrum was in agreement with the proposed structure.

Example III

The equipment was the same as described in Example I. A solution of 30 g. of anhydrous glutaraldehyde in 54 g. of anhydrous toluene was added over a period of 90 minutes at −50° to −60° C. to a solution consisting of 0.25 g. of aluminum triisopropoxide, 43 g. of anhydrous toluene, and 7 g. of anhydrous hexane. The reaction was continued for 18 hours between −55° and −50° C. under dry nitrogen.

The cold reaction mixture was coagulated into ligroin. The filtered, dried product weighted 27 g. The inherent viscosity was determined to be 0.55 (0.37 g./100 ml. of $CH_2Cl_2$ at 25° C.).

A 13.2 g. portion of the crude polymer was acetylated by reaction with 161 g. of acetic anhydride and 17 g. of anhydrous pyridine for 2 hours at 40° C. followed by an additional hour in the presence of some $Na_2CO_3$ at the same temperature. The reaction product was precipitated from methanol, filtered, redissolved in $CH_2Cl_2$, and reprecipitated from ligroin. After drying under vacuum, the yield was 11.33 g. (86 percent of the charge). Inherent viscosity 0.65 (0.3 g./100 ml. of $CH_2Cl_2$ at 25° C.).

The infrared spectra of both the crude polymer as well as the acetylated product were in agreement with the proposed structure. Transparent films were cast from the molten polymer by solution casting techniques.

Example IV

The equipment and procedure were essentially the same as described previously. A solution of 103 g. glutaraldehyde in 200 g. of toluene was added to a solution of 1.03 g. of aluminum triisobutyl in 152 g. of toluene at −54° to −60° C. during a period of six hours.

The catalyst was destroyed by the addition of a mixture of 80 ml. of acetone and 10 ml. of water. Thereafter, the reaction mixture was poured into a large excess of hexane whereupon a rubbery mass coagulated. The product was filtered and dried in vacuum yielding 64.3 g. of a solid product (62 percent), inherent viscosity of 0.10 (0.38 g./100 ml. of $CH_2Cl_2$ at 25° C.).

While the invention has been described in connection with the preparation of polyglutaraldehyde under given reaction conditions, it will be understood that the invention is capable of further modification, and it is not intended that the invention be limited to any particular embodiment herein disclosed. The invention should be construed by those skilled in the art having in mind all those changes, variations, modifications, and equivalents falling within the scope of the appended claims.

What is claimed is:
1. A linear, thermally stable, stereoregular, highly polymeric polyglutaraldehyde having a melting point between about 123° C. and 133° C. consisting essentially of recurring acetal units of the formula:

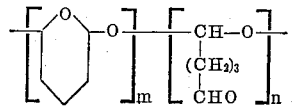

wherein $m$ is greater than $n$, said polyglutaraldehyde obtained by
   (a) polymerizing glutaraldehyde at a temperature of from −75° C. to 0° C. in the presence of a catalyst selected from the group consisting of organometallic compounds, metal halides, mixed organometallic halides, metal alkoxides, metal hydrides and tertiary phosphines; and
   (b) stabilizing said polyglutaraldehyde by adding a stabilizing agent selected from the group consisting of ester and ether end group precursors, said ester end group precursors selected from the group consisting of acetic anhydride, propionic anhydride, benzoic anhydride, acetyl chloride, benzoyl chloride and butyryl chloride, and said ether end group precursors selected from the group consisting of trimethyl orthoformate, triemthyl orthoacetate, triethyl orthoformate, and triethyl orthoacetate.

2. The polymeric composition of claim 1 wherein said material is obtained by intra-intermolecular polymerization of glutaraldehyde.

3. The polymeric material of claim 1 wherein the polymeric material is stabilized by adding an ester end group precursor in conjunction with an acid acceptor.

References Cited

UNITED STATES PATENTS

| | | | |
|---|---|---|---|
| 3,087,913 | 4/1963 | Kray et al. | 260—73 |
| 3,288,756 | 11/1966 | Buckley | 260—67 |
| 3,184,433 | 5/1965 | Vogl | 260—67 |
| 3,215,675 | 11/1965 | Koral et al. | 260—67 |

OTHER REFERENCES

Aso et al.: Bulletin of Chemical Society of Japan, vol. 35 No. 8 (1962), p. 1426, QD1C65.

Meyersen et al.: Die Makromolekulare Chemie, vol. 58, (1962), pp. 204–216, QD 281P6M2.

Overberger et al.: Journal of Polymer Science, vol. 62, No. 173 (1962), pp. S1–S2, QD 281P6J62.

WILLIAM H. SHORT, *Primary Examiner.*

L. M. PHYNES, *Assistant Examiner.*